US011454799B2

(12) United States Patent
Gisler et al.

(10) Patent No.: US 11,454,799 B2
(45) Date of Patent: Sep. 27, 2022

(54) MICROSCOPES WITH OBJECTIVE ASSEMBLY CRASH DETECTION AND METHODS OF UTILIIZING THE SAME

(71) Applicant: FormFactor, Inc., Livermore, CA (US)

(72) Inventors: Gerald Lee Gisler, St. Paul, OR (US);
Sia Choon Beng, Singapore (SG);
Anthony James Lord, Banbury (GB);
Gavin Neil Fisher, Fenny Compton (GB)

(73) Assignee: FormFactor, Inc., Livermore, CA (US)

( * ) Notice: Subject to any disclaimer, the term of this patent is extended or adjusted under 35 U.S.C. 154(b) by 237 days.

(21) Appl. No.: 16/752,324

(22) Filed: Jan. 24, 2020

(65) Prior Publication Data
US 2020/0241278 A1    Jul. 30, 2020

Related U.S. Application Data

(60) Provisional application No. 62/798,300, filed on Jan. 29, 2019.

(51) Int. Cl.
*G02B 21/36* (2006.01)
*G02B 21/02* (2006.01)
*G02B 21/26* (2006.01)

(52) U.S. Cl.
CPC .......... *G02B 21/368* (2013.01); *G02B 21/02* (2013.01); *G02B 21/367* (2013.01); *G02B 21/26* (2013.01)

(58) Field of Classification Search
CPC .... G02B 21/368; G02B 21/02; G02B 21/367; G02B 21/26; G02B 21/0016; G02B 21/24; G02B 21/248; G02B 21/32; G02B 21/36; G02B 21/365
See application file for complete search history.

(56) References Cited

U.S. PATENT DOCUMENTS

| 4,515,439 | A | * | 5/1985 | Esswein ................ G02B 21/02 359/381 |
| 5,706,127 | A | | 1/1998 | Saito et al. |
| 6,181,474 | B1 | | 1/2001 | Ouderkirk et al. |

(Continued)

FOREIGN PATENT DOCUMENTS

TW          M539057        12/2016

OTHER PUBLICATIONS

Components 101, "Micro Switch or Snap-action Switch", https://components101.com/switches/micro-switch-or-snap-action-switch, available online at least as of Aug. 20, 2018, accessed online Nov. 1, 2021 (Year: 2018).*

(Continued)

*Primary Examiner* — Derek S. Chapel
*Assistant Examiner* — Adam W Booher
(74) *Attorney, Agent, or Firm* — Dascenzo Gates Intellectual Property Law, P.C.

(57) ABSTRACT

Microscopes with objective assembly crash detection and methods of utilizing the same are disclosed herein. For example, a microscope comprises a microscope body, an objective assembly comprising an objective lens, an objective assembly mount configured to separably attach the objective assembly to the microscope body, and an orientation detection circuit configured to indicate when a relative orientation between the microscope body and the objective assembly differs from a predetermined relative orientation.

19 Claims, 8 Drawing Sheets

(56) References Cited

U.S. PATENT DOCUMENTS

| | | | |
|---|---|---|---|
| 6,307,672 B1 | 10/2001 | DeNure | |
| 6,358,749 B1 | 3/2002 | Orthman | |
| 7,130,116 B2 | 10/2006 | Tokunaga et al. | |
| 9,496,099 B2 | 11/2016 | McMahon et al. | |
| 10,156,718 B2 | 12/2018 | Koenig et al. | |
| 2004/0169915 A1 | 9/2004 | Yoneyama et al. | |
| 2005/0219687 A1* | 10/2005 | Aono | G02B 21/06 359/368 |
| 2006/0250687 A1* | 11/2006 | Karaki | G02B 21/02 359/368 |
| 2013/0021665 A1* | 1/2013 | Kubek | G02B 21/248 359/394 |
| 2015/0309295 A1 | 10/2015 | Cocker et al. | |
| 2018/0136448 A1* | 5/2018 | Cramb | G02B 21/248 |
| 2018/0321463 A1* | 11/2018 | Staley | G02B 27/141 |
| 2018/0364301 A1* | 12/2018 | Cole | G01R 1/073 |
| 2018/0373015 A1 | 12/2018 | Sakamoto et al. | |

OTHER PUBLICATIONS

English-language machine translation of TW M539057, Dec. 23, 2016.

\* cited by examiner

MICROSCOPES WITH OBJECTIVE ASSEMBLY CRASH DETECTION AND METHODS OF UTILIIZING THE SAME

RELATED APPLICATION

This application claims priority to U.S. Provisional Patent Application No. 62/798,300, which is entitled MICROSCOPES WITH OBJECTIVE ASSEMBLY CRASH DETECTION AND METHODS OF UTILIZING THE SAME, was filed on Jan. 29, 2019, and the complete disclosure of which is hereby incorporated by reference.

FIELD OF THE DISCLOSURE

The present disclosure relates generally to microscopes with objective assembly crash detection and/or to methods of utilizing the microscopes.

BACKGROUND OF THE DISCLOSURE

Microscopes often are utilized, within probe systems, to collect, store, and/or display optical images. These optical images may be utilized in automated and/or in manually controlled probe systems to facilitate alignment of probes of the probe system with a device under test (DUT), such as to permit testing of the DUT by the probe system. Because of the high levels of optical magnification and the tight tolerances involved, the microscope, or an objective assembly of the microscope, may collide with the DUT, with the probes, and/or with another component of the probe system. Additionally or alternatively, components of the probe system may collide with the objective assembly. Such collisions may cause damage to the microscope, the probe system, and/or the DUT. Thus, there exists a need for microscopes with objective assembly crash detection and/or for methods of utilizing the microscopes with objective assembly crash detection.

SUMMARY OF THE DISCLOSURE

Microscopes with objective assembly crash detection and methods of utilizing the same are disclosed herein. For example, a microscope comprises a microscope body, an objective assembly comprising an objective lens, an objective assembly mount configured to separably attach the objective assembly to the microscope body, and an orientation detection circuit configured to indicate when a relative orientation between the microscope body and the objective assembly differs from a predetermined relative orientation.

DETAILED DESCRIPTION AND BEST MODE OF THE DISCLOSURE

Figure 1:
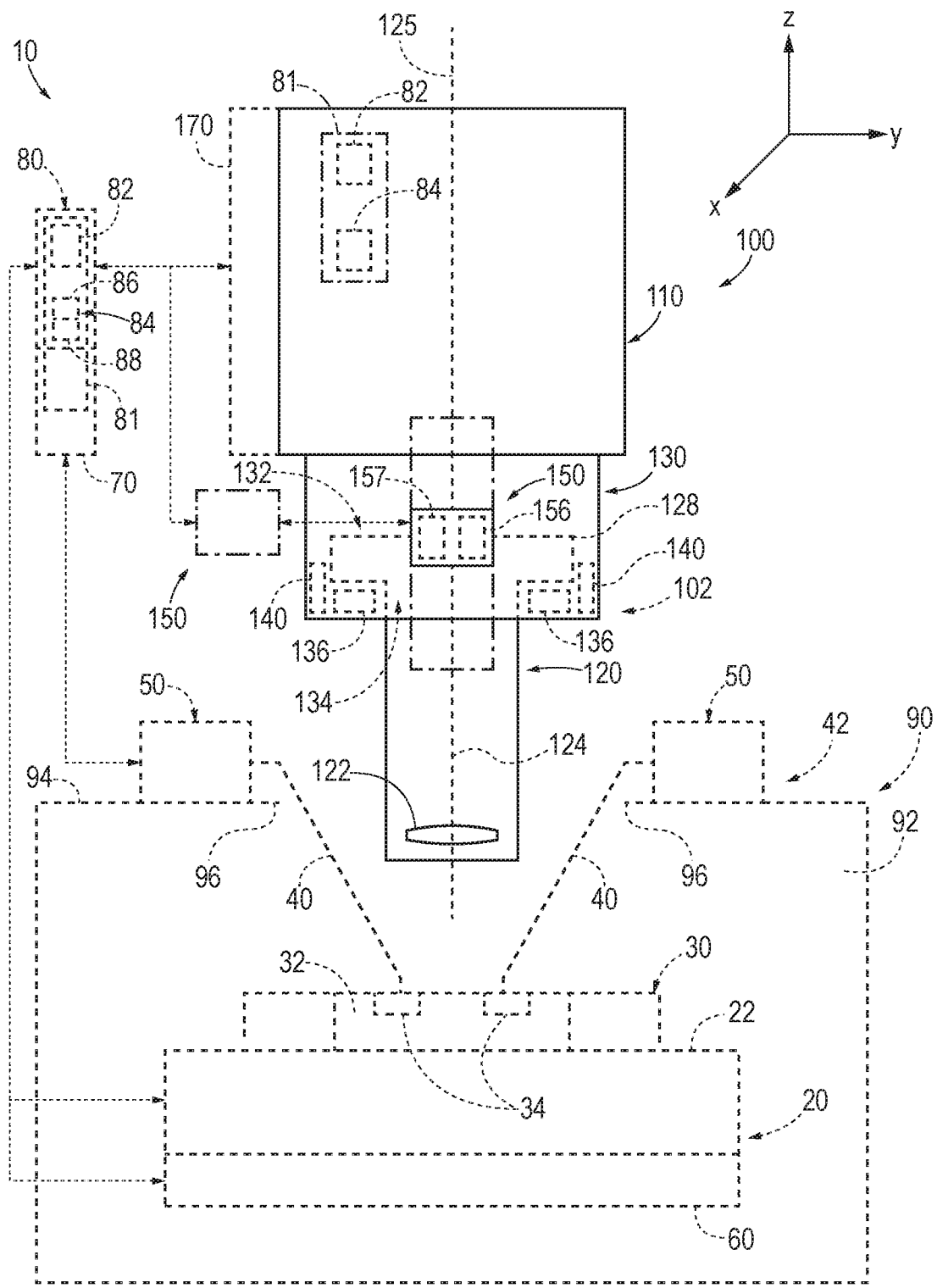
FIG. 1 is a schematic illustration of examples of a microscope that may form a portion of a probe system, according to the present disclosure.

FIGS. 1-8 provide examples of probe systems 10, microscopes 100, and/or methods 200, according to the present disclosure. Elements that serve a similar, or at least substantially similar, purpose are labeled with like numbers in each of FIGS. 1-8, and these elements may not be discussed in detail herein with reference to each of FIGS. 1-8. Similarly, all elements may not be labeled in each of FIGS. 1-8, but reference numerals associated therewith may be utilized herein for consistency. Elements, components, and/or features that are discussed herein with reference to one or more of FIGS. 1-8 may be included in and/or utilized with any of FIGS. 1-8 without departing from the scope of the present disclosure.

In general, elements that are likely to be included in a particular embodiment are illustrated in solid lines, while elements that are optional are illustrated in dashed lines. However, elements that are shown in solid lines may not be essential and, in some embodiments, may be omitted without departing from the scope of the present disclosure. Further, electrical connections (wired or wireless) between components are illustrated in dotted lines, and different possible pieces and/or positions of components are illustrated in dash-dot lines.

FIG. 1 is a schematic illustration of a microscope 100 that may form a portion of a probe system 10, according to the present disclosure. FIGS. 2-7 provide additional examples of microscopes 100 and/or components thereof. For convenience, the components of probe system 10 are generally described sequentially in the description herein, such that a given component is substantially fully described before beginning description of a new component. Thus, a given component may be introduced and described as it is schematically illustrated in FIG. 1, followed by a more detailed description of specific examples of the component as illustrated in one or more of FIGS. 2-7, before moving on to the next component. For this reason, FIGS. 1-7 are discussed collectively herein, followed by a description of FIG. 8.

Figure 2:
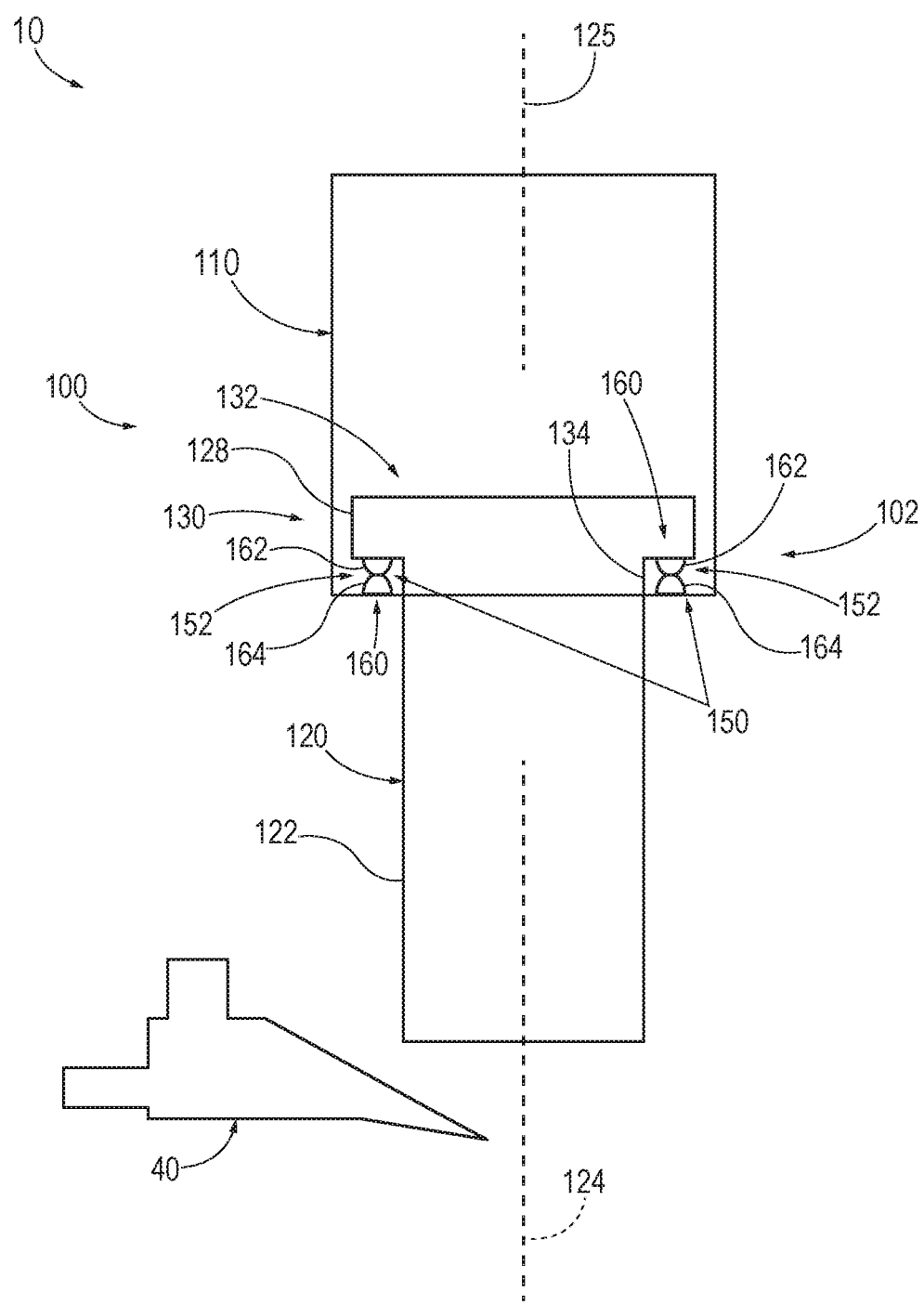
FIG. 2 is a schematic illustration of a microscope including a microscope body and an objective assembly, which define a predetermined relative orientation therebetween, prior to contact with a probe of a probe system.
Figure 3:
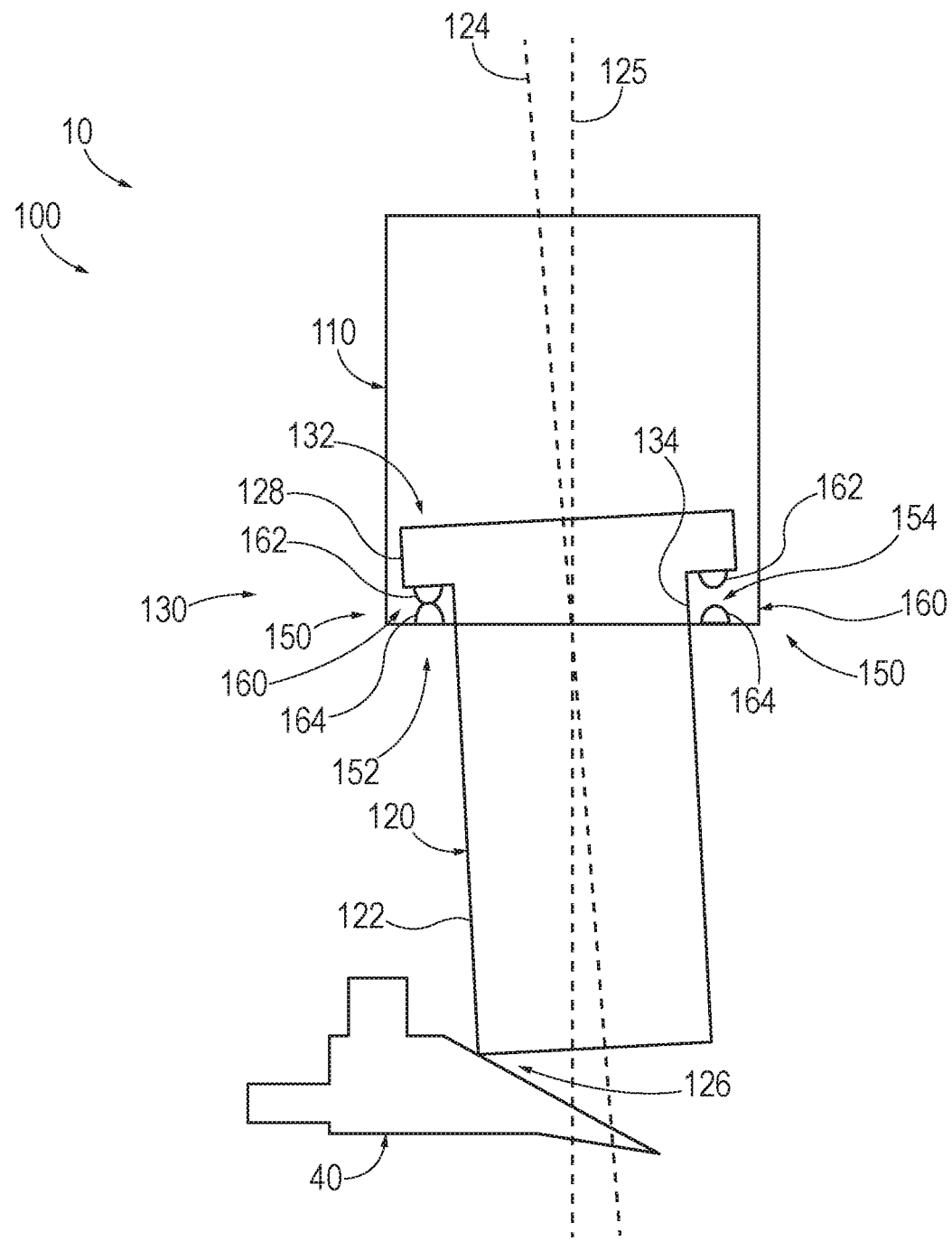
FIG. 3 is a schematic illustration of a microscope including a microscope body and an objective assembly, wherein the objective assembly has collided with a probe and the microscope body and the objective assembly define a different relative orientation therebetween than a predetermined relative orientation.

In more detail, the FIGS. 2-7 provide a specific example of an orientation detection circuit 150 that may be used to determine when a collision has occurred between microscope 100 and other components of probe system 10. In the example of FIGS. 2-7, orientation detection circuit 150 includes a plurality of contacting structures 160 included in an objective assembly 120 and an objective assembly mount 130 of microscope 100. FIGS. 2-3 illustrate how the relative orientation between objective assembly 120 and objective assembly mount 130 may change during and/or after a collision, and how this change in orientation may cause two or more of the contacting structures 160 to come out of contact with one another.

Figure 4:
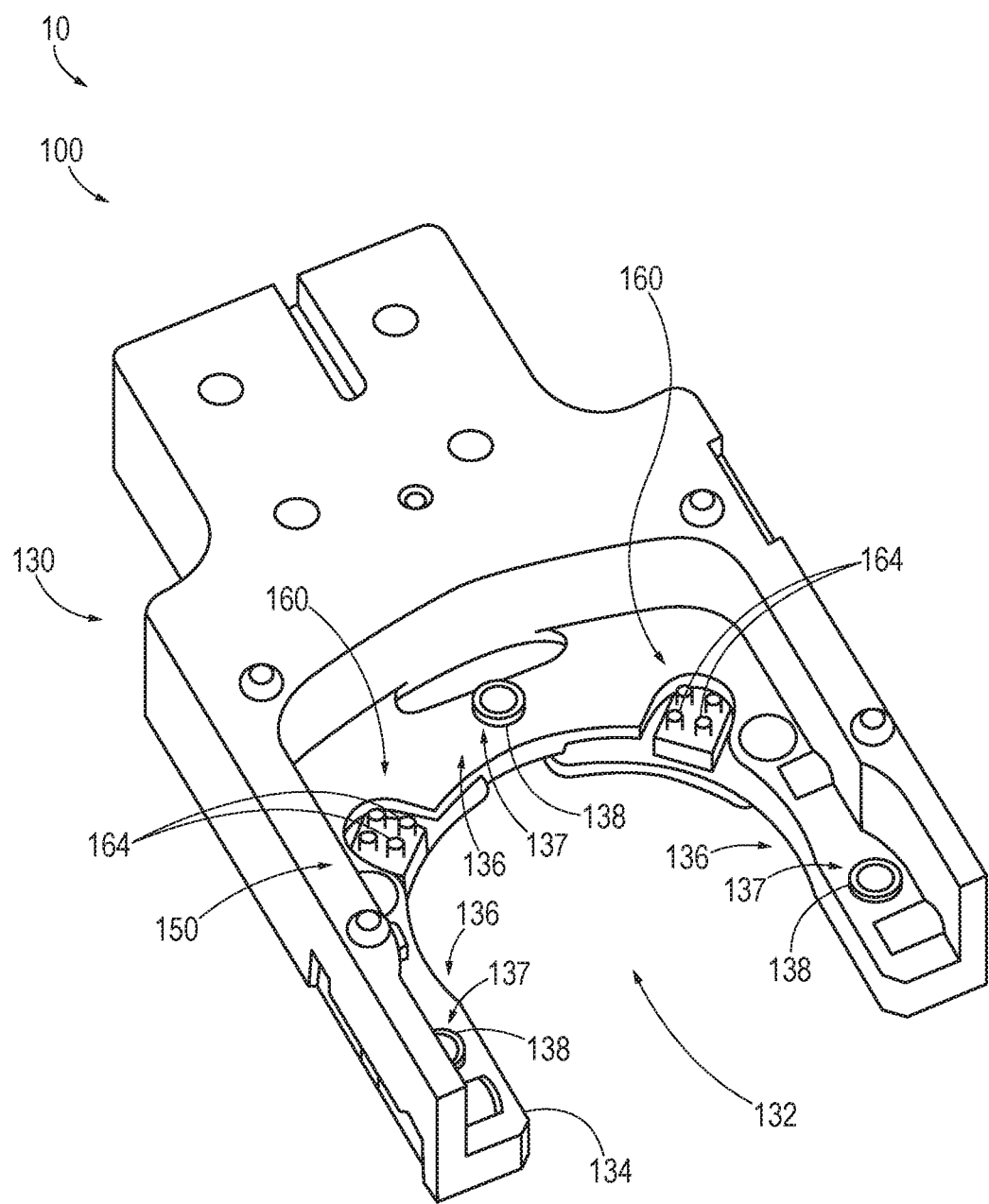
FIG. 4 is a less schematic illustration of an example of an objective assembly mount of a microscope, according to the present disclosure.
Figure 5:
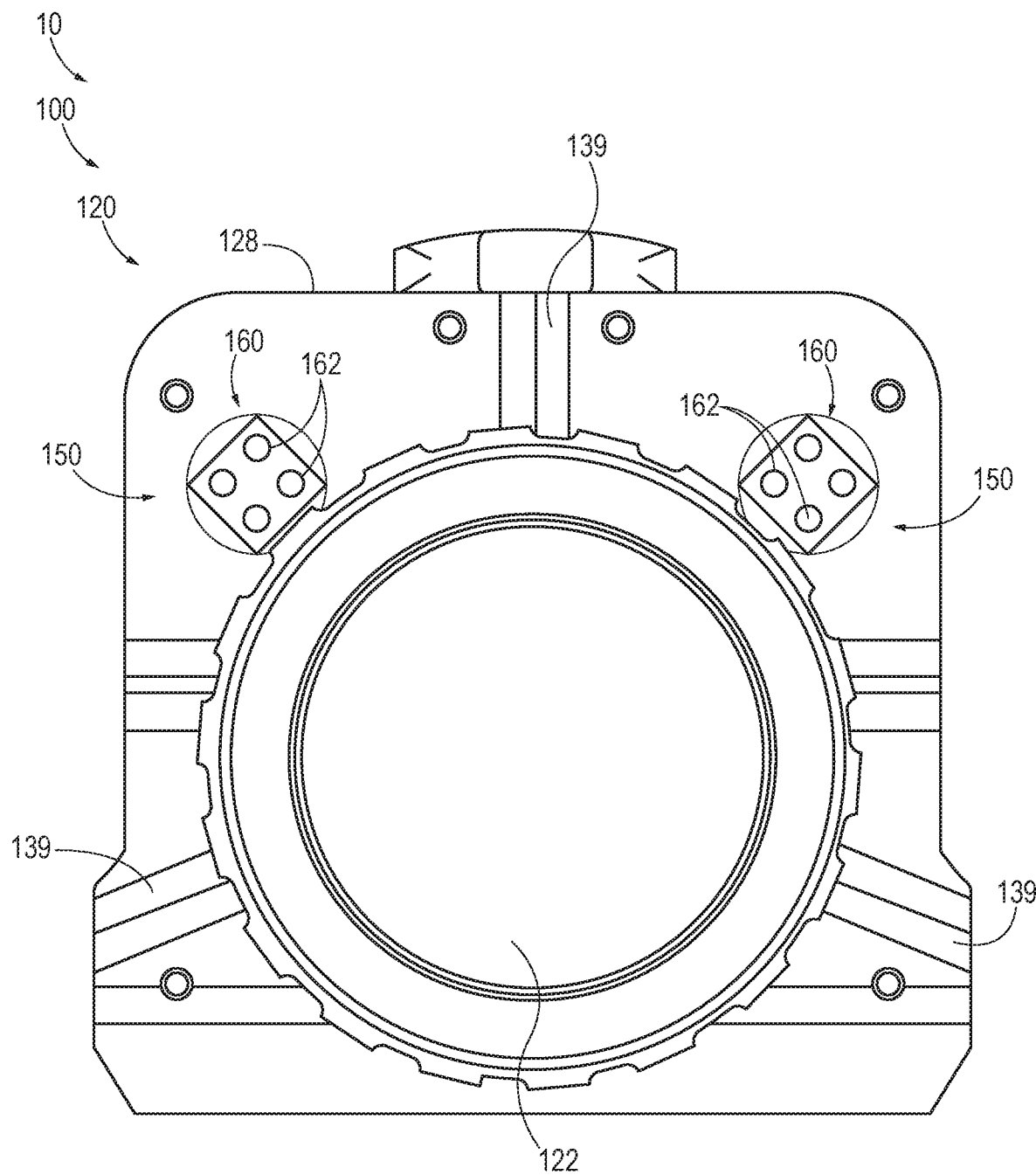
FIG. 5 is a less schematic bottom view of an objective assembly of a microscope, according to the present disclosure.
Figure 6:
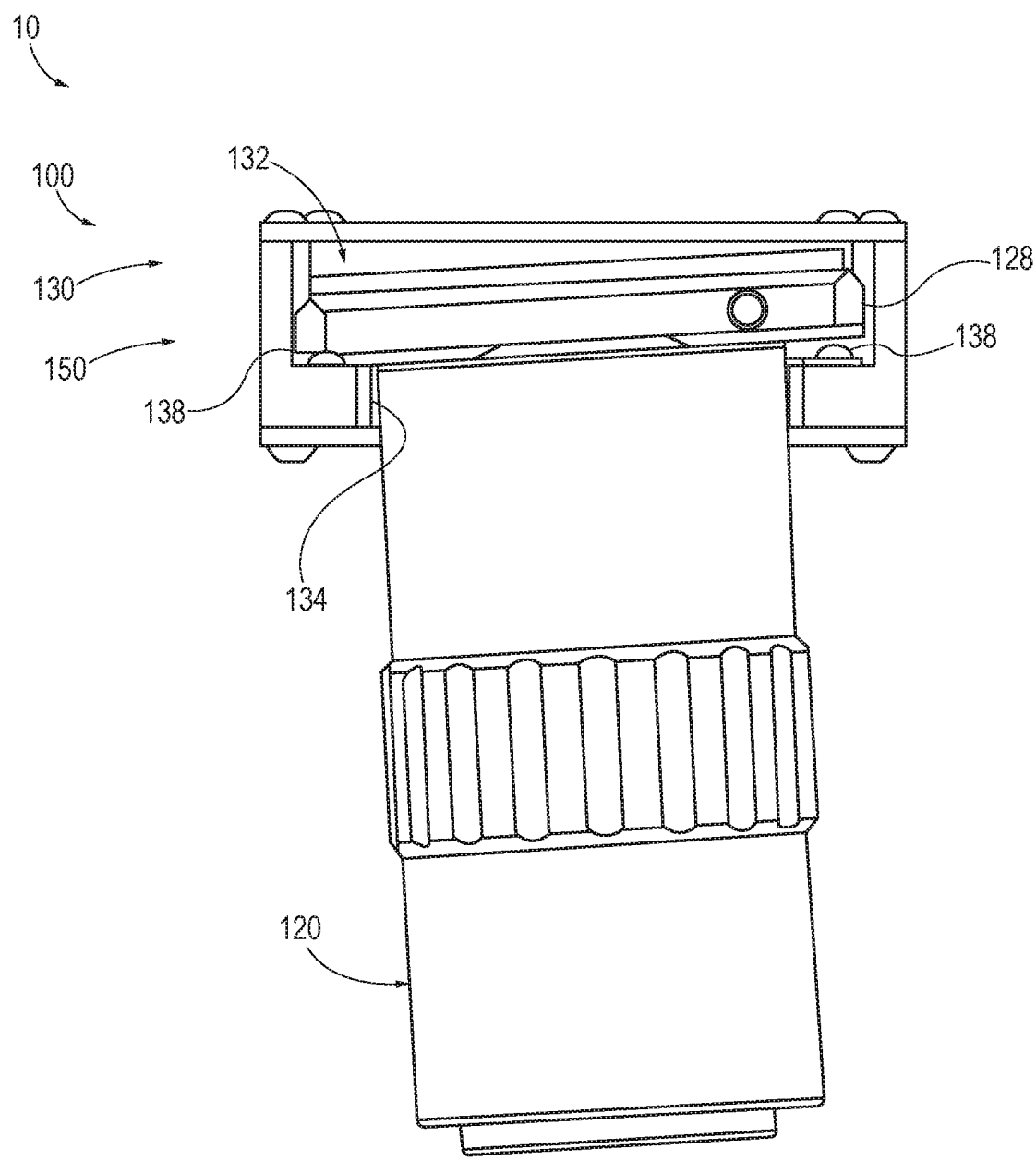
FIG. 6 is a less schematic illustration of an example levelling mechanism of an objective assembly mount and an objective assembly of a microscope according to the present disclosure, wherein the objective assembly and the objective assembly mount do not define a predetermined relative orientation therebetween.
Figure 7:
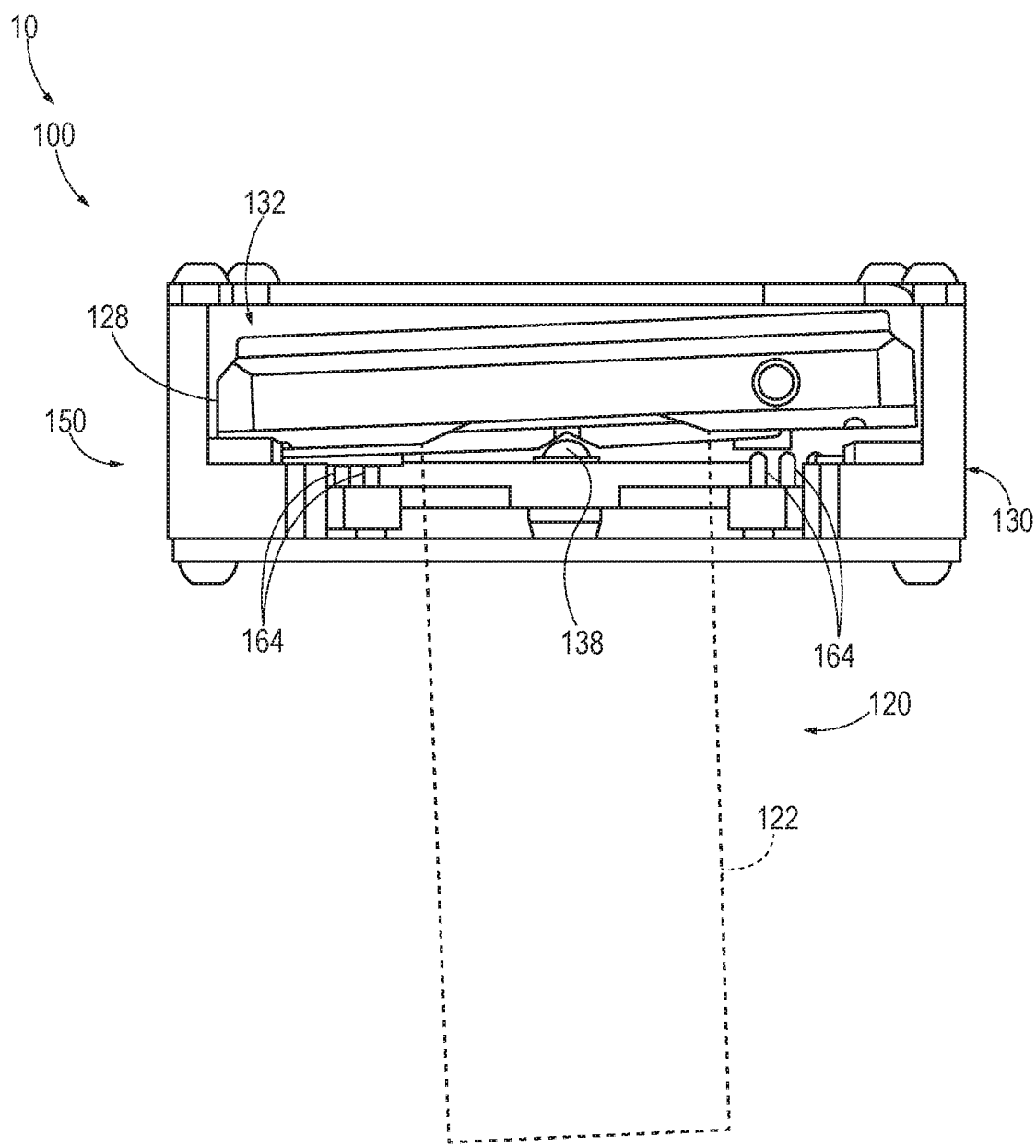
FIG. 7 is a less schematic illustration of an example orientation detection circuit of an objective assembly mount and an objective assembly of a microscope according to the present disclosure, wherein the objective assembly and the objective assembly mount do not define a predetermined relative orientation therebetween.
Figure 8:
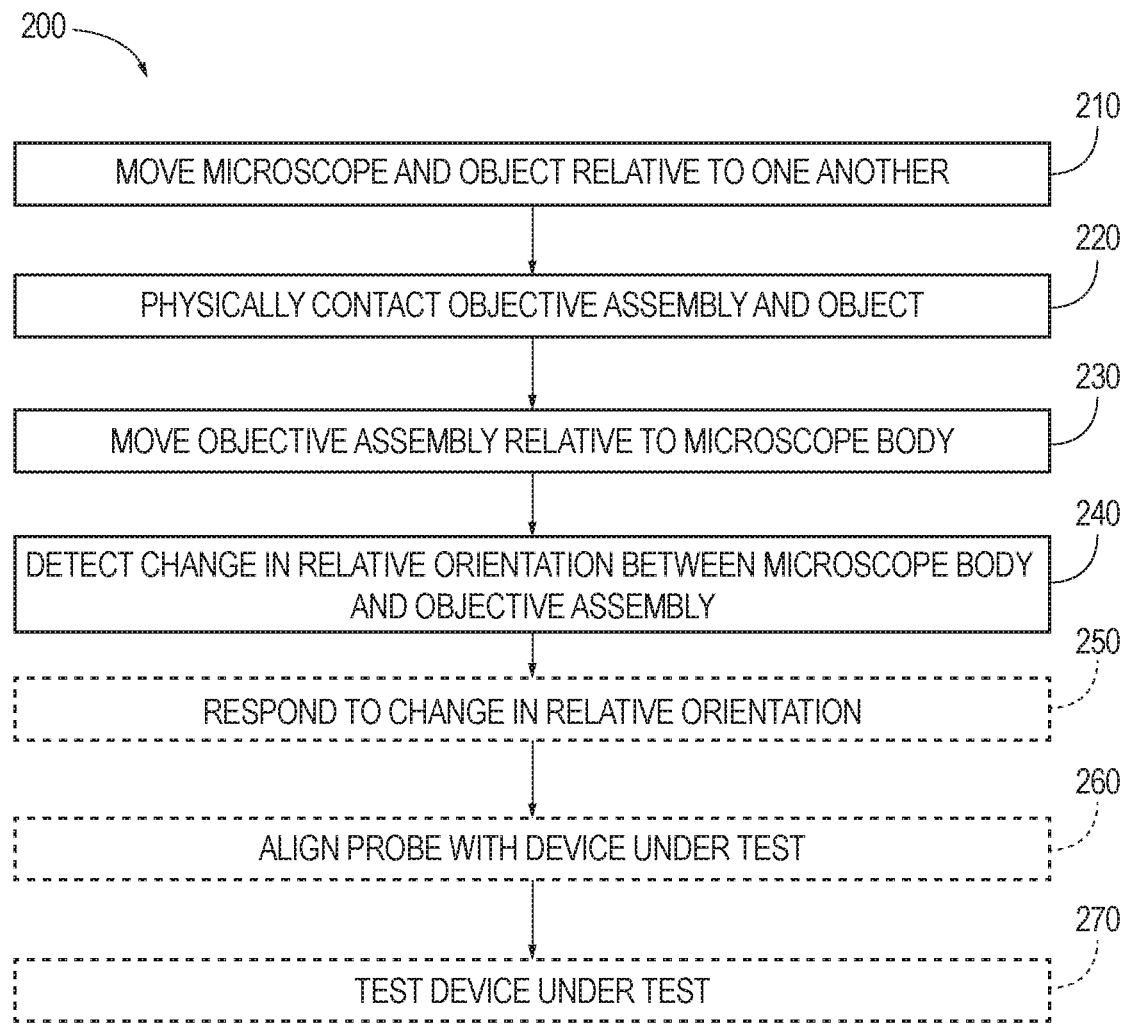
FIG. 8 is a flowchart depicting examples of methods of utilizing a microscope, according to the present disclosure.

FIGS. 4-7 illustrate how this example orientation detection circuit 150 (i.e. one containing a plurality of contacting structures 160) may be incorporated into objective assembly 120 and objective assembly mount 130, and further illustrate additional optional structures/components of objective assembly mount 130 and objective assembly 120. In particular, FIG. 4 illustrates an example objective assembly mount 130 that comprises one or more of contacting structure 160 and various other structures/components such as a levelling mechanism 136, and FIG. 5 shows a bottom view of objective assembly 120, and in particular, the bottom surface of a projecting region 128 of objective assembly 120 that directly interfaces with objective assembly mount 130. This bottom surface of projecting region 128 may comprise one or more contacting structures 160 that interface with contacting structure 160 of objective assembly mount 130. FIGS. 6 and 7 further illustrate examples of objective assembly 120 and objective assembly mount 130 post-collision, where objective assembly 120 and objective assembly mount 130 are out of alignment. FIG. 8 shows an example method for detecting and/or mitigating a collision between objective assembly 120 and various components of probe system 10.

As illustrated collectively by FIGS. 1-7, microscope 100 includes a microscope body 110 and an objective assembly 120 comprising an objective lens 122. Microscope 100 also includes objective assembly mount 130 and an orientation detection circuit 150. As illustrated in dashed lines in FIG. 1, microscope 100 also may include a drive mechanism 170.

As discussed, microscope 100 may be included in and/or may form a portion of probe system 10. Probe system 10 may include a plurality of components, examples of which are illustrated in dashed lines in FIG. 1. As an example, probe system 10 may include a chuck 20. Chuck 20 may include and/or may define a support surface 22, and support surface 22 may be sized, shaped, and/or configured to receive and/or to support a substrate 30. Substrate 30 may include at least one device under test (DUT) 32, and probe system 10 may be configured to test, to electrically test, and/or to optically test operation of the DUT. Examples of chuck 20 include a wafer chuck, an electrostatic chuck, and/or a temperature-controlled chuck.

As another example, probe system 10 may include a probe 40 that may be configured to communicate with DUT 32. As an example, probe 40 may be configured to contact, or to electrically contact, DUT 32, such as with a contact pad 34 of the DUT. As another example, probe 40 may be configured for wireless communication with DUT 32. Examples of probe 40 include an electrical probe, an electrical conductor, a high frequency probe, a wireless probe, an antenna, and/or a near-field antenna.

As yet another example, probe system 10 may include a manipulator 50. Manipulator 50 may be configured to operatively translate probe 40 relative to support surface 22 and/or relative to DUT 32, such as to permit and/or facilitate alignment of the probe with the DUT. As an example, manipulator 50 may be utilized to electrically contact probe 40 with the contact pad of the DUT. This may include translation of probe 40 along the X, Y, and/or Z-axes of FIG. 1. Examples of manipulator 50 include a mechanical manipulator, an electrical manipulator, a lead screw and nut, a ball screw and nut, a linear actuator, a stepper motor, and/or a piezoelectric actuator.

In other examples, probe 40 may form a portion of a probe card 42. In these examples, probe system 10 may not include, or may not be required to include, manipulator 50. An example of probe card 42 includes a card for testing electronic and/or optoelectronic devices and that includes a plurality of probes 40 that defines a fixed, or an at least substantially fixed, relative orientation therebetween.

As another example, probe system 10 may include a drive assembly 60. Drive assembly 60 may be configured to selectively control a relative orientation between probe 40 and support surface 22 and/or DUT 32. As examples, drive assembly 60 may be configured to operatively translate chuck 20 along the X, Y, and/or Z-axes of FIG. 1 and/or to rotate chuck 20 about the Z-axis. Examples of drive assembly 60 include a linear actuator, a rotary actuator, a lead screw and nut, a ball screw and nut, a stepper motor, and/or a piezoelectric actuator.

As yet another example, probe system 10 may include a signal generation and analysis assembly 70. Signal generation and analysis assembly 70 may be configured to provide a test signal to DUT 32 and/or to receive a resultant signal from DUT 32, such as via probe 40 and/or chuck 20. Examples of signal generation and analysis assembly 70 include a function generator, an electric signal generator, a wireless signal generator, an optical signal generator, an electric signal analyzer, a wireless signal analyzer, and/or an optical signal analyzer.

As another example, probe system 10 may include a control system 80. Control system 80 may be programmed to control the operation of at least a portion of probe system 10, such as chuck 20, manipulator 50, drive assembly 60, signal generation and analysis assembly 70, and/or microscope 100. This may include controlling the operation of probe system 10 according to any of the methods 200 that are disclosed herein. It is within the scope of the present disclosure that signal generation and analysis assembly 70 may be integrated into and/or may be integral with control system 80. Alternatively, it also is within the scope of the present disclosure that signal generation and analysis assembly 70 may be distinct and/or separate from control system 80. Examples of control system 80 are disclosed herein.

As yet another example, probe system 10 may include an enclosure 90. Enclosure 90 may define an enclosed volume 92 that may house and/or contain at least support surface 22 and/or substrate 30. Enclosure 90 may define an aperture 96, and probes 40 and/or at least a portion of microscope 100 may extend through the aperture. In some examples, enclosure 90 may include a platen 94 that may define aperture 96 and/or that may support manipulator 50, probe 40, and/or probe card 42.

During operation of probe system 10, various components of probe system 10 purposefully may be moved relative to one another. As an example, drive mechanism 170 may be utilized to operatively translate microscope 100 along an optical axis 124 of objective lens 122, such as to permit and/or facilitate focusing of microscope 100 on another component of probe system 10 and/or on DUT 32. In some examples, the entire microscope 100, including microscope body 110, moves along optical axis 124 responsive to actuation by drive mechanism 170. However, in other examples, only objective assembly 120 and objective assembly mount 130 move along optical axis 124, and microscope body 110 remains in place. The drive mechanism may additionally be configured to operatively translate microscope 100 laterally (i.e. along a plane perpendicular to the optical axis of the objective lens). Thus, drive mechanism 170 may not only be configured to move the microscope up and down along optical axis 124, but also may be configured to move microscope 100 sideways to different locations above DUT 32.

Drive mechanism 170 may include and/or be any suitable structure that may, or that may be utilized to, operatively transition microscope 100 along optical axis 124. Examples of drive mechanism 170 include a mechanical drive mechanism, an electrical drive mechanism, and/or a pneumatic drive mechanism. Additional examples of drive mechanism 170 include a linear actuator, a pneumatic cylinder, a linear motor, and/or a linear voice coil motor.

As another example, manipulator 50 may be utilized to operatively translate probe 40 relative to support surface 22 and/or relative to microscope 100. As yet another example, drive assembly 60 may be utilized to translate and/or to rotate support surface 22 of chuck 20 relative to probe 40 and/or relative to microscope 100.

During any and/or all of these relative motions, microscope 100 may be utilized to collect an image, or an optical image, of the other component of probe system 10 and/or of DUT 32. Because of the relative motion, and under certain circumstances, objective assembly 120 may contact, may collide with, and/or may crash into DUT 32 and/or into another component of probe system 10. As discussed, such collisions, if permitted to proceed, may damage the probe system and/or the DUT. Thus, it may be desirable to quickly detect such collisions and to cease relative motion before damage, or before significant damage, occurs.

Objective assembly 120, according to the present disclosure, may be configured to mitigate the impact force of such collisions by, for example, moving relative to objective assembly mount 130 and/or microscope body 110 when the objective assembly makes contact with another object. Microscope 100, according to the present disclosure, also may be configured to rapidly detect such collisions by detecting this relative motion between objective assembly 120 and microscope body 110 (e.g., pivoting of objective assembly 120 relative to objective assembly mount 130 and/or microscope body 110). Microscope 100, also may be configured to take corrective actions, such as ceasing relative motion of the colliding components and/or retracting the colliding objects from one another, to prevent and/or mitigate damage to the colliding components.

A collision, and the relative motion it may cause between objective assembly 120 and microscope body 110, is illustrated in the transition between FIGS. 2 and 3. In FIG. 2, objective assembly 120 is attached to microscope body 110 via objective assembly mount 130 and is oriented at a predetermined relative orientation 102 relative to microscope body 110. In the example illustrated in FIG. 2, predetermined relative orientation 102 is an orientation in which optical axis 124 of objective lens 122 is parallel to central axis 125 of microscope body 110. However, in other examples, optical axis 124 may be at an angle to central axis 125 of microscope body 110 in predetermined relative orientation 102. Microscope 100 also is illustrated translating along optical axis 124 and/or toward probe 40 in FIG. 2, and orientation detection circuit 150 detects and/or indicates that the objective assembly is oriented at predetermined relative orientation 102.

Subsequently, and as illustrated in FIG. 3, objective assembly 120 contacts, or collides with, probe 40, such as is indicated at 126. This collision between the objective assembly and the probe may cause the relative orientation between the objective assembly and microscope body to change and/or to differ from predetermined relative orientation 102 of FIG. 2. As an example, as illustrated in FIG. 3, optical axis 124 of objective lens 122 and central axis 125 of microscope body 110 are no longer parallel to one another. Instead, they are at an angle with respect to one another. Thus, in FIG. 3, objective assembly 120 has pivoted relative to microscope body 110 away from predetermined relative orientation 102 of FIG. 2. In this way, objective assembly 120 may be configured to move and/or pivot relative to objective assembly mount 130, optionally to permit the relative orientation between microscope body 110 and objective assembly 120 to differ from the predetermined relative orientation 102.

Orientation detection circuit 150 detects this change in relative orientation, such as by detecting that microscope body 110 and objective assembly 120 are not in predetermined relative orientation 102 of FIG. 2, thereby permitting and/or facilitating rapid response to the collision and decreasing a potential for damage. Orientation detection circuit 150 may include any suitable structure that may be adapted and/or configured to detect, determine, and/or indicate a change in relative orientation between objective assembly 120 and microscope body 110. Additionally or alternatively, orientation detection circuit 150 may include any suitable structure that may be adapted and/or configured to detect, determine, and/or indicate when the relative orientation between microscope body 110 and objective assembly 120 differs from predetermined relative orientation 102. As illustrated in FIG. 1, orientation detection circuit 150 may comprise one or more electric circuits that may be configured such that, when the relative orientation between microscope body 110 and objective assembly 120 changes from predetermined relative orientation 102, an electrical continuity of orientation detection circuit 150 changes, an electric current within orientation detection circuit 150 changes, and/or a voltage of orientation detection circuit 150 changes.

As an example, orientation detection circuit 150 may comprise an electric switch 156. Electric switch 156 may be a normally closed switch that is configured to open (i.e. prevent and/or reduce current flow through the circuit) when the relative orientation between objective assembly 120 and microscope body 110 differs from predetermined relative orientation 102. Alternatively, electric switch 156 may be a normally open switch that is configured to close (i.e. increase and/or permit current flow therethrough) when the relative orientation between objective assembly 120 and microscope body 110 differs from predetermined relative orientation 102. In either example, the electrical continuity of electric switch 156 changes when the relative orientation between objective assembly 120 and microscope body 110 changes from predetermined relative orientation 102.

In some examples, the change in the electrical continuity of electric switch 156 (e.g., the change from closed to open or vice versa) automatically stops and/or powers off drive mechanism 170 and/or other actuators of probe system 10. However, in other examples, control system 80 and/or orientation detection circuit 150 may comprise a continuity detection circuit that actively monitors current flow through electric switch 156 and/or the circuit containing electric switch 156. For example, the continuity detection circuit may comprise an ammeter, a volt meter, or the like. In such examples, control system 80 may estimate changes in the relative orientation between objective assembly 120 and objective assembly mount 130 and/or microscope body 110 based on output from the continuity detection circuit, and may adjust operation of one or more of the actuators responsive to this output.

In one example of electric switch 156, electric switch 156 may comprise contacting structures 160, as illustrated in FIGS. 2-5 and 7. In particular, contacting structures 160 may be arranged in corresponding pairs on objective assembly 120 and objective assembly mount 130. In particular, objective assembly 120 may include an objective assembly contacting structure 162, and objective assembly mount 130 may include an objective assembly mount contacting structure 164. In particular, objective assembly contacting structure 162 may be operatively attached to objective assembly 120 and objective assembly mount contacting structure 164 may be operatively attached to objective assembly mount 130. In addition, contacting structures 162 and 164 may be positioned such that, when objective assembly 120 and microscope body 110 are in predetermined relative orientation 102, the contacting structures 162 and 164 are in electrical communication with each other. Such a configuration is illustrated in FIG. 2, which illustrates two pairs of contacting structures 160. Thus, objective assembly mount contacting structure 164 and objective assembly contacting structure 162 may include two or more contacting structures in some examples. In FIG. 2, objective assembly mount contacting structure 164 is in contact, as indicated at 152, with objective assembly contacting structure 162.

In this example, the change in relative orientation caused by objective assembly 120 colliding with an object of probe system 10 may cause one or more pairs of contacting structures 160 to transition from being in contact with one another, as indicated at 152 (in FIG. 2), to being out of contact with one another, as indicated at 154 (in FIG. 3). Thus, when objective assembly 120 and microscope body 110 are not in predetermined relative orientation 102 or when the relative orientation between the objective assembly and the microscope body differs or changes from predetermined relative orientation 102, at least one objective assembly contacting structure 162 and one objective assembly mount contacting structure 164 may transition to being out of contact with one another, as indicated in FIG. 3 at 154. This transition may be detected, by orientation detection circuit 150 and/or by control system 80 of FIG. 1, as a change in electrical continuity, and/or as a lack of electrical continuity, between the objective assembly mount contacting structure and the objective assembly contacting structure, thereby indicating that collision 126 has occurred. Probe system 10 and/or microscope 100 thereof may detect this lack of continuity, such as via a continuity detection circuit that is in electrical communication with each objective assembly contacting structure 162 and objective assembly mount contacting structure 164. Probe system 10 and/or microscope 100 thereof then may interpret this lack of, or change in, continuity as an indication that objective assembly 120 has collided with the DUT and/or with another component of probe system 10 and may respond accordingly.

Contacting structures 160 may include and/or be any suitable structure that may permit and/or facilitate establishment of electrical communication between the corresponding pairs of contacting structures. As an example, the objective assembly contacting structure and/or the objective assembly mount contacting structure may include and/or be an electrically conductive surface and/or an electrically conductive flat surface. As another example, the objective assembly contacting structure and/or the objective assembly mount contacting structure may include and/or may be a spring-loaded electrically conductive contact, or pin, such as a Pogo Pin™. As yet another example, slots and surfaces may form and/or define the objective assembly contacting structure and/or the objective assembly mount contacting structure.

In another example, orientation detection circuit 150 may comprise a position sensor 157 configured to detect changes in the relative orientation between objective assembly 120 and microscope body 110 and/or objective assembly mount 130. In some examples, the position sensor may include two or more position sensors. Position sensor 157 may include any suitable structure that may be adapted, configured, designed, and/or constructed to determine, to calculate, and/or to measure the relative positon and/or distance between objective assembly 120 and objective assembly mount 130. In particular, position sensor 157 may be configured to convert changes in the relative orientation between the microscope body and the objective assembly into electrical signals that then may be communicated to control system 80. Examples of position sensors 157 include a capacitance distance sensor, an optical distance sensor, an inductive distance sensor, a linear variable differential transducer (LVDT), an Eddy current sensor, a Hall effect sensor, an optical sensor, and/or an interferometer. Control system 80 may interpret these outputted electrical signals to determine if a collision has occurred.

As one such example, position sensor 157 may detect changes in the relative orientation between objective assembly 120 and microscope body 110 and/or objective assembly mount 130 by measuring a distance between objective assembly 120 and objective assembly mount 130 and/or microscope body 110. As one example, a collision may cause objective assembly 120 to pivot relative to objective assembly mount 130 and/or microscope body 110. Position sensor 157 may detect this pivoting because the distance between objective assembly 120 and objective assembly mount 130 and/or microscope body 110 may change due to the pivoting. In particular, some regions of objective assembly 120 may come closer to objective assembly mount 130, and other regions may get farther away from objective assembly mount 130, when objective assembly 120 pivots away from predetermined relative orientation 102 and/or to a different relative orientation.

Position sensor 157 may be contained, or fully contained, within either objective assembly 120 or objective assembly mount 130, and may be spaced apart from the other of the two components in which it is not included. For example, position sensor 157 may be included in only objective assembly 120 and may be spaced apart from objective assembly mount 130. In such a configuration, position sensor 157 may be configured to measure the distance between it and objective assembly mount 130. Conversely, when position sensor 157 is included in only objective assembly mount 130, the position sensor may be spaced apart from objective assembly 120, and may be configured to measure the distance between it and objective assembly 120.

However, in other examples, such as when position sensor 157 comprises a Hall effect sensor, the position sensor may comprise one or more components that are included in both objective assembly 120 and objective assembly mount 130. For example, a sensing element of the Hall effect sensor may be included in objective assembly mount 130, and a magnet of the Hall effect sensor may be included in objective assembly 120, as just one example.

As illustrated by the dash-dot lines in FIG. 1, orientation detection circuit 150 may be included at different positions within probe system 10 and/or may comprise multiple parts that may be positioned at different locations within and/or throughout probe system 10. As an example, orientation detection circuit 150 may be at least partially included in both objective assembly 120 and objective assembly mount 130. As one such example, and as described above, orientation detection circuit 150 may include contacting structures 162 and 164 that may be coupled to and/or included within objective assembly 120 and objective assembly mount 130 to form a type of switch.

However, in other examples, orientation detection circuit 150 may be wholly included in only one component of the microscope. For example, orientation detection circuit 150 may be included entirely within either objective assembly 120 or objective assembly mount 130. As one such example, and as described above, orientation detection circuit 150 may comprise position sensor 157 that may be included in either objective assembly 120 or objective assembly mount 130.

In still further examples, orientation detection circuit 150 may be positioned outside of objective assembly mount 130, as illustrated by the dash-dot lines in FIG. 1. As one such example, at least a portion or a part of orientation detection circuit 150 may be included in control system 80 and/or between control system 80 and microscope 100. For example, orientation detection circuit 150 may be positioned outside (i.e. external to) objective assembly mount 130, but may receive a signal (e.g., electrical, optical, wireless, etc.,) generated and/or collected within objective assembly mount 130. As one such example, microscope 100 may include a sensor or other structure, such as position sensor 157, that is positioned within the objective assembly mount 130 and is configured to measure the relative orientation between objective assembly 120 and objective assembly mount 130. In particular, the sensor or other structure may be configured to generate a signal that is indicative of the relative orientation between objective assembly 120 and objective assembly mount 130. When orientation detection circuit 150 is positioned outside of the objective assembly mount 130, this signal may be transmitted from the sensor or other structure, outside the objective assembly mount 130, to orientation detection circuit 150. As just one example, an optical signal corresponding to the relative orientation between objective assembly 120 and objective assembly mount 130 may be transmitted by a fiber optic cable from within objective assembly mount 130 to the externally positioned orientation detection circuit.

Control system 80 may be in electrical communication (wired or wireless) with orientation detection circuit 150 for receiving an indication of the relative orientation between microscope body 110 and objective assembly 120 (e.g., based on electrical signals received from orientation detection circuit 150). Based on detected changes in the relative orientation, control system 80 may determine that collision 126 has occurred. Responsive to determining that collision 126 has occurred, control system 80 may adjust movement of objective assembly 120, probe 40, and/or DUT 32 via the one or more actuators (e.g., drive mechanism 170, drive assembly 60, and manipulator 50) to mitigate collision 126. As one example, probe system 10 may cease relative motion among the various components involved in collision 126, may cease motion of microscope 100, may retract microscope 100, and/or may retract one or more of the other components of probe system 10 involved in collision 126, such as probe 40 and/or DUT 32. Additionally or alternatively, probe system 10 may sound an alarm, display a dialog, and/or otherwise indicate, to a user of the microscope, that the collision has occurred.

In particular, control system 80 may be programmed to control various actuators of probe system 10 (e.g., drive mechanism 170, manipulator 50, drive assembly 60, etc.) to control movement of probe 40, DUT 32, and microscope 100 (and therefore objective assembly 120). When included, control system 80 may comprise a controller 81 (e.g., electric circuits). Controller 81 may include two or more controllers, in some examples. Each controller 81 may comprise a processing unit 82 and/or a memory unit 84. Memory unit 84 may store computer-readable instructions (the software) and processing unit 82 may execute the stored computer-readable instructions to perform the various collision detection and mitigation techniques described herein.

In some examples, controller 81 may be at least partially included in signal generation and analysis assembly 70. For example, processing unit 82 and/or memory unit 84 may be at least partially included in signal generation and analysis assembly 70. When included, memory unit 84 may comprise non-volatile (also referred to herein as "non-transitory") memory 86 (e.g., ROM, PROM, and EPROM) and/or volatile (also referred to herein as "transitory") memory 88 (e.g., RAM, SRAM, and DRAM), in some examples. Processing unit 82 may comprise one or more integrated circuits including, but not limited to, one or more of: field-programmable gate arrays (FPGAs), application-specific integrated circuits (ASICs), digital signal processors (DSPs), microprocessors, microcontrollers, programmable array logic (PALs), and complex programmable logic devices (CPLDs).

Control system 80 may comprise controllers (e.g., electric circuits), located in different locations, and/or included in different devices, of probe system 10. As one example, a corresponding controller 81 may be included in microscope 100, and more specifically in microscope body 110, as indicated by dash-dot lines in FIG. 1. In some such examples, the corresponding controller 81 that may be fully included within microscope 100 and/or may be programmed to control the components of microscope 100, such as to control drive mechanism 170 to adjust translation of microscope 100 along optical axis 124. Said another way, microscope 100 may at least partially include control system 80 by including the corresponding controller 81 of control system 80. In some further such examples, the corresponding controller 81 that may be fully included within microscope 100, may be dedicated to just microscope 100, and/or accordingly may be programmed to control only components of microscope 100, such as drive mechanism 170, and not manipulator 50 or drive assembly 60.

Control system 80 may additionally or alternatively comprise one or more other controllers positioned outside microscope 100 that may be programmed to control the other actuators of probe system 10, such as manipulator 50 and/or drive assembly 60. In one specific example, control system 80 may include two controllers: one in microscope 100 for controlling operation of microscope 100, and another outside of the microscope for controlling the various actuators of probe system 10 (e.g., manipulator 50, drive assembly 60, etc.). However, in other examples, control system 80 may include more than one controller outside of microscope 100. As one such example, each of the actuators (e.g., manipulator 50, drive assembly 60, etc.) may include its own dedicated controller.

In still further examples, control system 80 may not include a controller within microscope 100 and may instead control operation of microscope 100 from an external controller that is positioned outside of microscope 100. In a yet further example, control system 80 may include a single controller that is partially included in microscope 100 and partially positioned exterior to microscope 100.

Control system 80 and/or controller 81 may include at least a part of, or all of, orientation detection circuit 150, in some examples.

As will be described in greater detail below, control system 80 may be programmed to execute various methods, such as the methods schematically represented in FIG. 8. In particular, control system 80 may be programmed to: 1) detect collisions between objective assembly 120 and other components of probe system 10; 2) cease relative motion among the various components involved in the collision such as objective assembly 120, probe 40 and/or DUT 32; 3) retract one or more of the various components involved in the collision; and/or 4) sound an alarm, display a dialog, and/or otherwise indicate, to a user of the microscope, that the collision has occurred.

For example, a controller 81 included in microscope 100 may include computer-readable instructions stored in non-transitory memory 86 for controlling drive mechanism 170 to stop and/or reverse movement of microscope 100 responsive to orientation detection circuit 150 providing an indication that the relative orientation between microscope body 110 and objective assembly 120 differs from predetermined relative orientation 102. Processing unit 82 may carry out these stored computer-readable instructions to control drive mechanism 170. In particular, processing unit 82 may be in electrical communication with drive mechanism 170 and may be programmed to send a command signal to drive mechanism 170 to stop and/or reverse motion of microscope 100 responsive to the indication that the relative orientation between microscope body 110 and objective assembly 120 differs from predetermined relative orientation 102.

In another example, control system 80 may include computer-readable instructions stored in non-transitory memory 86 for controlling one or more of the other external actuators positioned outside the microscope (e.g., manipulator 50 and drive assembly 60). In particular, control system 80 may include computer-readable instructions stored in non-transitory memory 86 for controlling manipulator 50 and/or drive assembly 60, to stop motion and/or reverse the direction of motion (i.e. retract) of probe 40 and/or support surface 22 of chuck 20, respectively, responsive to orientation detection circuit 150 providing an indication that the relative orientation between microscope body 110 and objective assembly 120 differs from predetermined relative orientation 102. In some examples, such as where probe system 10 includes multiple moving components, control system 80 may include computer-readable instructions for determining which probe system component (e.g. which probe 40) has collided with objective assembly 120, and control system 80 may only stop the motion of and/or retract that particular probe system component. However, in other examples, control system 80 may simply stop the motion of and/or reverse the direction of motion (i.e. retract) all of the probe system components when a collision occurs.

By detecting collisions and stopping and/or ceasing motion of microscope 100 and/or the external components of probe system 10 when a collision is detected, damage to the collided components of the probe system may be mitigated. The collided objects may additionally or alternatively be retracted from one another to further mitigate the impact of the collision, and/or to allow for quick inspection of the collided parts. Further, by allowing objective assembly 120 to pivot relative to microscope body 110 when a collision occurs, the forces generated during collisions between objective assembly 120 and components of probe system 10 may be dampened and/or decreased, thereby reducing the amount of damage done by such collisions before the motion of microscope 100 is stopped.

Microscope body 110 may include any suitable structure that may permit and/or facilitate the collection of images, or of optical images, by microscope 100. These may include structures that may be conventional to microscopes, to optical microscopes, to electronic microscopes, and/or to microscopes that are configured to collect digital images. As examples, microscope body 110 may include one or more lenses, mirrors, charge coupled devices (CCDs), actuators, memory devices, electronic devices, electrical conductors, and/or logic devices such as corresponding controller 81.

Objective assembly 120 may include any suitable structure that may include objective lens 122. This may include structures that may be conventional to microscopes, to optical microscopes, to electronic microscopes, and/or to microscopes that are configured to collect digital images. It is within the scope of the present disclosure that objective assembly 120 may at least partially form and/or define orientation detection circuit 150, as discussed in more detail herein.

As illustrated in FIGS. 2-3 and 5-7, objective assembly 120 may include a projecting region 128 that may extend away from optical axis 124. Projecting region 128 may be shaped and/or sized to interface with objective assembly mount 130 and/or to retain objective assembly 120 within the objective assembly mount, as discussed in more detail herein. Projecting region 128 may include at least a portion of orientation detection circuit 150. For example, if the orientation detection circuit comprises contacting structure 160 as illustrated in FIGS. 2 and 3, projecting region 128 may include one or more of contacting structures 160.

Objective assembly mount 130 may include any suitable structure that may be configured to separably attach objective assembly 120 to microscope body 110. As an example, and as illustrated in FIGS. 1-4 and 6-7, objective assembly mount 130 may define a receiving region 132 that may be shaped and/or sized to receive at least a portion of objective assembly 120, such as projecting region 128 thereof. Further, receiving region 132 may define a restricted region 134 that may be sized to support projecting region 128 of objective assembly 120 and also to permit a portion of objective assembly 120 to pass therethrough.

As perhaps best illustrated in FIGS. 6 and 7, receiving region 132 may be oversized relative to projecting region 128 and/or may be sized to permit at least limited translation and/or rotation of objective assembly 120 while objective assembly mount 130 operably and/or separably attaches objective assembly 120 to microscope body 110. In one example, receiving region 132 may be configured to permit objective assembly 120 to pivot relative to objective assembly mount 130 within receiving region 132, such as may be responsive to collision 126. In particular, receiving region 132 may be oversized relative to objective assembly 120 to permit objective assembly 120 to pivot relative to objective assembly mount 130. Although objective assembly 120 may be configured to pivot relative to objective assembly mount 130 and/or microscope body 110, objective assembly mount 130 may not be configured to pivot relative to microscope body 110. That is, the relative orientation of objective assembly mount 130 and microscope body 100 may be fixed (i.e. not adjustable).

Such a configuration may permit and/or facilitate detection of contacts, collisions, and/or crashes by orientation detection circuit 150, as discussed herein. Such a configuration additionally or alternatively may permit and/or facilitate separable attachment of objective assembly 120 to microscope body 110, such as via insertion of projecting region 128 into receiving region 132 and/or removal of projecting region 128 from receiving region 132.

In some examples, objective assembly 120 and objective assembly mount 130 may be configured to utilize the force of gravity to bias the objective assembly toward the predetermined relative orientation. As one such example, the objective assembly mount may comprise a levelling mechanism 136 that defines a plane (e.g., x-y plane in FIG. 1). In some such examples, this plane may be orthogonal to the force of gravity (z-axis in FIG. 1). When microscope 100 is orientated such that the force of gravity acts along the negative z-axis of FIG. 1, the force of gravity may bias projecting region 128 toward and/or into contact with levelling mechanism 136 of objective assembly mount 130. Because levelling mechanism 136 defines a substantially flat plane, levelling mechanism 136 in combination with the force of gravity may bias objective assembly 120 into alignment with objective assembly mount 130 such that optical axis 124 of the objective assembly is parallel to central axis 125 of objective assembly mount 130 and microscope body 110.

As an example, levelling mechanism 136 may include and/or define a 3-point mount 137 as illustrated in FIGS. 4-7. Three-point mount 137 may comprise three spaced-apart at least partially spherical surfaces 138 that may project into receiving region 132. In other examples, levelling mechanism 136 may comprise one or more of a kinematic, and/or a quasi-kinematic mount. The tips of the at least partially spherical surfaces may define a flat plane on which objective assembly 120 may rest under the influence of gravity.

Further, objective assembly 120 and/or projecting region 128 thereof may include three slots and/or grooves 139, as perhaps best illustrated in FIG. 5. Surfaces 138 may be shaped and/or sized to be received within grooves 139 when projecting region 128 is received within receiving region 132 of objective assembly mount 130 and microscope body 110 and objective assembly 120 define predetermined relative orientation 102 therebetween. As discussed, microscope 100 may be oriented and/or positioned such that the force of gravity retains surfaces 138 within grooves 139 and/or such that the force of gravity retains microscope body 110 and objective assembly 120 in predetermined relative orientation 102.

As illustrated in dashed lines in FIG. 1, objective assembly mount 130 may include a biasing mechanism 140 that may be configured to bias the objective assembly towards predetermined relative orientation 102. Biasing mechanism 140 may be configured to bias microscope body 110 and objective assembly 120 toward predetermined relative orientation 102 and/or to bias projecting region 128 toward restricted region 134. Stated another way, biasing mechanism 140 may supplement the force of gravity in urging microscope body 110 and objective assembly 120 toward predetermined relative orientation 102. Biasing mechanism 140 may comprise a magnetic assembly or other suitable assembly for biasing objective assembly 120 toward predetermined relative orientation 102. For example, a magnetic assembly may include magnets in both projecting region 128 of objective assembly 120 and in receiving region 132 and/or restricted region 134 of objective assembly mount 130.

Biasing mechanism 140 may decrease a potential for, or prevent, unwanted pivoting of objective assembly 120. In particular, biasing mechanism 140 may help to ensure that objective assembly 120 stays in place during normal microscope operation and only moves relative to microscope body 110 when a collision occurs.

FIG. 8 is a flowchart depicting examples of methods 200 of detecting and/or mitigating a collision between a microscope, such as microscope 100 of FIGS. 1-7, and an object. As described above, control system 80 may be programmed to perform one or more of the methods 200. In particular, control system 80 may include computer-readable instructions stored in non-transitory memory 86 for performing one or more of methods 200. Methods 200 include moving the microscope and the object relative to one another at 210 and physically contacting an objective assembly of the microscope with the object at 220. Methods 200 also include moving the objective assembly relative to a microscope body of the microscope at 230 and detecting a change in a relative orientation between the microscope body and the objective assembly at 240. Methods 200 further may include responding to the change in relative orientation at 250, aligning a probe with a device under test (DUT) at 260, and/or testing the DUT at 270.

Moving the microscope and the object relative to one another at 210 may include translating, pivoting, and/or rotating at least one of the microscope and the object relative to the other of the microscope and the object. The moving at 210 may produce, or result in, the physically contacting at 220. Stated another way, the physically contacting at 220 may be a result of the moving at 210, may be responsive to the moving at 210, may be an undesired result of the moving at 210, may be an unexpected result of the moving at 210, or may be an unanticipated result of the moving at 210.

The moving at 210 may be accomplished in any suitable manner. As an example, the moving at 210 may include moving the microscope with a drive mechanism, such as drive mechanism 170 of FIG. 1. As another example, the object may include a probe of a probe system that includes the microscope and the moving at 210 may include moving the probe with a manipulator, such as manipulator 50 of FIG. 1. As another example, the object may include the DUT and the moving at 210 may include moving the DUT with a drive assembly, such as drive assembly 60 of FIG. 1.

Physically contacting the objective assembly of the microscope with the object at 220 may include bringing the objective assembly and the object into direct physical contact with one another and may be a result of the moving at 210. Additionally or alternatively, the physically contacting at 220 may include applying a first force to the objective assembly with the object and/or applying a second force to the object with the objective assembly. The physically contacting at 220 may produce, generate, and/or result in the moving at 230. Examples of the object include the probe, such as probe 40 of FIG. 1, and/or the DUT, such as DUT 32 of FIG. 1. Additional examples of the object include a cable of the probe system and/or a probe card of the probe system.

Moving the objective assembly relative to the microscope body of the microscope at 230 may include rotating, pivoting and/or translating the objective assembly relative to the microscope body and may be responsive to, or a result of, the physically contacting at 220. Stated another way, the first force, which is applied to the objective assembly by the object during the physically contacting at 220 may cause relative motion between the objective assembly and the microscope body.

The moving the objective assembly relative to the microscope body may further comprise adjusting one or more of a voltage, current, and/or electrical continuity in an electric circuit (e.g., orientation detection circuit 150) of the microscope. For example, in examples where the orientation detection circuit comprises an electric switch, the moving the objective assembly relative to the microscope body may comprise opening or closing the electric switch. The opening or closing the electric switch may comprise pivoting the objective assembly relative to the microscope body to separate the objective assembly from at least one electrical contacting structure of the objective assembly mount such that the objective assembly does not physically contact the at least one electrical contacting structure. This pivoting of the objective assembly relative to the microscope body may comprise pivoting the objective assembly away from a predetermined relative orientation.

As discussed, the objective assembly may be separably attached to the microscope body with, via, and/or utilizing an objective assembly mount, such as objective assembly mount 130 of FIGS. 1-4 and 6-7. As also discussed, the objective assembly mount may utilize the force of gravity and/or a supplemental force, which may be generated by a biasing mechanism, to retain the objective assembly and the microscope body in the predetermined relative orientation. As such, the first force, which is applied to the objective assembly during the physically contacting at 220 may be sufficient to overcome the gravitational force and/or the supplemental force, thereby causing the relative motion between the objective assembly and the microscope body and/or causing the objective assembly and the microscope body to transition away from the predetermined relative orientation and/or to a relative orientation that differs from the predetermined relative orientation.

Detecting the change in the relative orientation between the microscope body and the objective assembly at 240 may include detecting the change in relative orientation in any suitable manner. As an example, the microscope may include the orientation detection circuit, such as orientation detection circuit 150 of FIGS. 1-7, and the detecting at 240 may include detecting with, via, and/or utilizing the orientation detection circuit. As a more specific example, the detecting at 240 may include detecting a change in electrical continuity (e.g., opening and/or closing of an electric switch such as electric switch 156) within the orientation detection circuit, such as between a contacting structure, such as contacting structures 160, that is operatively attached to the objective assembly mount and another contacting structure that is operatively attached to the objective assembly. Detecting the moving of the objective assembly relative to the microscope body may additionally or alternatively comprise detecting a change in one or more of the voltage and current in the orientation detection circuit. In still further examples, the detecting the moving of the objective assembly relative to the microscope body may comprise detecting the moving at 230 with a position sensor and/or detecting a change in relative orientation produced by the moving at 230 with the position sensor.

Responding to the change in relative orientation at 250 may include performing at least one action responsive to detecting the change in relative orientation. In particular, the responding may comprise adjusting the moving of the microscope and/or one or more actuators outside of the microscope in the probe system, such as manipulator 50 and drive assembly 60. As examples, the responding at 250 may include ceasing motion of the microscope (e.g., ceasing the moving at 210), retracting the microscope away from the object, ceasing and/or reversing translation (i.e. retracting) of the probe, ceasing and/or reversing translation (i.e. retracting) of the DUT, and/or generating an alert that is indicative of physical contact between the objective assembly and the object.

Methods 200 may be utilized during operation of the probe system, such as to test the device under test. In such examples, methods 200 further may include aligning the probe with the device under test (DUT) at 260. The aligning at 260 may include collecting one or more images of the probe and/or of the DUT with the microscope and/or utilizing the one or more images to align the probe with the DUT, to contact the probe with the DUT, and/or to contact the probe with a contact pad of the DUT.

When methods 200 are utilized during operation of the probe system, methods 200 further may include testing the DUT at 270. The testing at 270 may include providing a test signal to the DUT and/or receiving a resultant signal from the DUT.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, A, B, and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It also is within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/ or methods, are also within the scope of the present disclosure.

Illustrative, non-exclusive examples of systems and methods according to the present disclosure are presented in the following enumerated paragraphs. It is within the scope of the present disclosure that an individual step of a method recited herein, including in the following enumerated paragraphs, may additionally or alternatively be referred to as a "step for" performing the recited action.

A1. A microscope comprising:
a microscope body;
an objective assembly comprising an objective lens;
an objective assembly mount configured to separably attach the objective assembly to the microscope body; and
an orientation detection circuit configured to indicate when a relative orientation between the microscope body and the objective assembly differs from a predetermined relative orientation.

A2. The microscope of paragraph A1, wherein the microscope further includes a drive mechanism configured to operatively translate the microscope along an optical axis of the objective lens.

A2.1. The microscope of paragraph A2, wherein the drive mechanism is further configured to operatively translate the microscope along a plane perpendicular to the optical axis of the objective lens.

A3. The microscope of any of paragraphs A1-A2.1, wherein the orientation detection circuit comprises one or more electric circuits, wherein the orientation detection circuit is configured such that, when the relative orientation between the microscope body and the objective assembly changes from the predetermined relative orientation, at least one of:
  (i) an electrical continuity of the orientation detection circuit changes;
  (ii) an electric current within the orientation detection circuit changes; and
  (iii) a voltage of the orientation detection circuit changes.

A4. The microscope of any of paragraphs A1-A3, wherein the orientation detection circuit comprises an electric switch.

A4.1. The microscope of paragraph A4, wherein the electric switch is normally closed when the relative orientation between the objective assembly and the microscope body is the predetermined relative orientation, and wherein the electric switch opens when the relative orientation between the microscope body and the objective assembly differs from the predetermined relative orientation.

A4.2. The microscope of any of paragraphs A4-A4.1, wherein the electric switch is normally open when the relative orientation between the objective assembly and the microscope body is the predetermined relative orientation, and wherein the electric switch closes when the relative orientation between the microscope body and the objective assembly differs from the predetermined relative orientation.

A4.3. The microscope of any of paragraphs A4-A4.2, wherein the electric switch comprises a matching pair of electrical contacting surfaces, wherein one electrical contacting surface of the matching pair of electrical contacting surfaces is included in the objective assembly and the other electrical contacting surface of the matching pair of electrical contacting surfaces is included in the objective assembly mount.

A5. The microscope of any of paragraphs A1-A4.3, wherein the orientation detection circuit comprises a position sensor configured to detect changes in the relative orientation between the microscope body and the objective assembly.

A5.1. The microscope of paragraph A5, wherein the position sensor is configured to convert changes in the relative orientation between the microscope body and the objective assembly into electrical signals.

A.5.2. The microscope of any of paragraphs A5-A5.1, wherein the position sensor is configured to measure a distance between the objective assembly and at least one of:
  (i) the objective assembly mount; and
  (ii) the microscope body.

A5.3. The microscope of any of paragraphs A5-A5.2, wherein the position sensor comprises one or more of a capacitance distance sensor, an optical distance sensor, an inductive distance sensor, a linear variable differential transducer (LVDT), an Eddy current sensor, a Hall effect sensor, an optical sensor, and an interferometer.

A5.4. The microscope of any of paragraphs A5-A5.3, wherein the position sensor is included in the objective assembly mount and is spaced-apart from the objective assembly.

A5.5. The microscope of any of paragraphs A5-A5.3, wherein the position sensor is included in the objective assembly and is spaced-apart from the objective assembly mount.

A6. The microscope of any of paragraphs A1-A5.5, further comprising a controller in electrical communication with the orientation detection circuit for receiving an indication of the relative orientation between the microscope body and the objective assembly.

A6.1. The microscope of paragraph A6, wherein the controller comprises:

non-transitory memory comprising stored computer-readable instructions for stopping movement of the microscope when an indication that the relative orientation between the microscope body and the objective assembly differs from the predetermined relative orientation is received from the orientation detection circuit; and a processing unit programmed to execute the stored computer-readable instructions.

A6.1.1. The microscope of paragraph A6.1 when depending from paragraph A2, wherein the processing unit is in electrical communication with the drive mechanism, wherein the processing unit is programmed to control operation of the drive mechanism, and further wherein the processing unit is programmed to send a command signal to the drive mechanism to stop motion the microscope responsive to the indication that the relative orientation between the microscope body and the objective assembly differs from the predetermined relative orientation.

A6.1.2. The microscope of any of paragraphs A6.1-A6.1.1, wherein the non-transitory memory further includes computer-readable instructions for reversing a direction of motion of the microscope responsive to the indication that the relative orientation between the microscope body and the objective assembly differs from the predetermined relative orientation.

A6.1.3. The microscope of any of paragraphs A6.1-A6.1.2, wherein the processing unit is programmed to send a command signal to the drive mechanism to reverse the direction of motion of the microscope responsive to the indication that the relative orientation between the microscope body and the objective assembly differs from the predetermined relative orientation.

A7. The microscope of any of paragraphs A1-A6.1.3, wherein the objective assembly is configured to selectively pivot relative to the objective assembly mount, optionally to permit the relative orientation between the microscope body and the objective assembly to differ from the predetermined relative orientation.

A7.1. The microscope of paragraph A7, wherein the objective assembly mount comprises a receiving region configured to retain the objective assembly, and wherein the receiving region is configured to permit the objective assembly to selectively pivot relative to the objective assembly mount within the receiving region.

A7.1.1. The microscope of paragraph A7.1, wherein the receiving region is oversized relative to the objective assembly to permit the objective assembly to selectively pivot relative to the objective assembly mount.

A8. The microscope of any of paragraphs A1-A7.1.1, wherein the objective assembly mount is configured to utilize gravitational force to bias the objective assembly toward the predetermined relative orientation.

A8.1. The microscope of paragraph A8, further comprising a levelling mechanism that uses gravity to support the objective assembly in the predetermined relative orientation.

A8.1.1. The microscope of paragraph A8.1, wherein the levelling mechanism comprises one or more of a 3-point mounting structure, a kinematic mounting structure, and a quasi-kinematic mounting structure.

A9. The microscope of any of paragraphs A1-A8.1.1, wherein the objective assembly mount further comprises one or more biasing mechanisms configured to bias the objective assembly towards the predetermined relative orientation.

A9.1. The microscope of paragraph A9, wherein the one or more biasing mechanisms comprise a magnetic assembly.

B1. A probe system for testing a device under test (DUT), the probe system comprising:

at least one of:
(i) a chuck that defines a support surface configured to receive a substrate that includes the DUT;
(ii) a probe configured to communicate with the DUT;
(iii) a manipulator configured to operatively translate the probe relative to the support surface;
(iv) a drive assembly configured to selectively control a relative orientation between the probe and the support surface;
(v) a signal generation and analysis assembly configured to provide a test signal to the DUT and also to receive a resultant signal from the DUT;
(vi) an enclosure defining an enclosed volume that contains the support surface; and
(vii) a control system programmed to control the operation of the probe system; and the microscope of any of paragraphs A1-A9.1, wherein the microscope is configured to collect an image of at least one of the probe and the DUT.

C1. A method of detecting a collision between a microscope and an object, wherein the microscope comprises an objective assembly and a microscope body, the method comprising:

moving the microscope and the object relative to one another;

physically contacting the objective assembly and the object;

responsive to the physically contacting, moving the objective assembly relative to the microscope body; and detecting the moving of the objective assembly relative to the microscope body.

C2. The method of paragraph C1, wherein the method further comprises adjusting the moving of the microscope responsive to the moving of the objective assembly relative to the microscope body.

C2.1. The method of paragraph C2, wherein the adjusting the moving of the microscope comprises ceasing motion of the microscope.

C2.2. The method of any of paragraphs C2-C2.1, wherein the adjusting the moving of the microscope comprises retracting the microscope away from the object.

C3. The method of any of paragraphs C1-C2.2, further comprising generating an alert that is indicative of physical contact between the objective assembly and the object responsive to the detecting the moving of the objective assembly relative to the microscope body.

C4. The method of any of paragraphs C1-C3, further comprising ceasing motion of a test probe responsive to the detecting the moving of the objective assembly relative to the microscope body.

C5. The method of any of paragraphs C1-C4, further comprising ceasing motion of a device under test responsive to the detecting the moving of the objective assembly relative to the microscope body.

C6. The method of any of paragraphs C1-C5, wherein moving the objective assembly relative to the microscope body comprises adjusting one or more of a voltage and current in an electric circuit of the microscope, and wherein the detecting the moving of the objective assembly relative to the microscope body comprises detecting a change in one or more of the voltage and current in the electric circuit.

C6.1. The method of paragraph C6, wherein the electric circuit comprises an electric switch, wherein the moving the objective assembly relative to the microscope body comprises opening or closing the electric switch, and wherein the detecting the moving of the objective assembly relative to the microscope body comprises detecting the opening or closing of the electric switch.

C7. The method of any of paragraphs C1-C6.1, wherein the detecting the moving of the objective assembly relative to the microscope body comprises detecting the moving of the objective assembly relative to the microscope body with a position sensor.

C8. The method of any of paragraphs C1-C7, wherein the moving the objective assembly relative to the microscope body comprises pivoting the objective assembly relative to the microscope body to change a relative orientation between the microscope body and the objective assembly from a predetermined relative orientation.

C8.1. The method of paragraph C8, wherein the pivoting the objective assembly relative to the microscope body comprises separating the objective assembly from at least one electrical contacting structure of an objective assembly mount such that the objective assembly does not physically contact the at least one electrical contacting structure.

C9. The method of any of paragraphs C1-C8.1, further comprising aligning a probe with a device under test.

C9.1. The method of paragraph C9, further comprising testing the device under test.

C10. The method of any of paragraphs C1-C9.1, wherein the microscope includes the microscope of any of paragraphs A1-A9.1.

D1. A microscope comprising:
a microscope body;
an objective assembly mount configured to separably attach an objective assembly to the microscope body; and
the objective assembly, wherein the objective assembly comprises an objective lens, and wherein the objective assembly is configured to pivot relative to one or more of the microscope body and the objective assembly mount.

D2. The microscope of paragraph D1, further comprising the subject matter of any of paragraphs A1-A9.1.

INDUSTRIAL APPLICABILITY

The microscopes and methods disclosed herein are applicable to the imaging and semiconductor test industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, when the disclosure, the preceding numbered paragraphs, or subsequently filed claims recite "a" or "a first" element or the equivalent thereof, such claims should be understood to include incorporation of one or more such elements, neither requiring nor excluding two or more such elements.

Applicant reserves the right to submit claims directed to certain combinations and subcombinations that are directed to one of the disclosed inventions and are believed to be novel and non-obvious. Inventions embodied in other combinations and subcombinations of features, functions, elements and/or properties may be claimed through amendment of those claims or presentation of new claims in that or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. A microscope comprising:
a microscope body;
an objective assembly comprising an objective lens;
an objective assembly mount configured to separably attach the objective assembly to the microscope body;
an orientation detection circuit configured to indicate when a relative orientation between the microscope body and the objective assembly differs from a predetermined relative orientation; and
a levelling mechanism that uses gravity to support the objective assembly in the predetermined relative orientation, wherein the levelling mechanism comprises a 3-point kinematic mounting structure.

2. The microscope of claim 1, wherein the orientation detection circuit comprises one or more electric circuits, wherein the orientation detection circuit is configured such that, when the relative orientation between the microscope body and the objective assembly changes from the predetermined relative orientation, at least one of:
(i) an electrical continuity of the orientation detection circuit changes;
(ii) an electric current within the orientation detection circuit changes; and
(iii) a voltage of the orientation detection circuit changes.

3. The microscope of claim 1, wherein the orientation detection circuit comprises an electric switch.

4. The microscope of claim 3, wherein the electric switch is normally closed when the relative orientation between the objective assembly and the microscope body is the predetermined relative orientation, and wherein the electric switch opens when the relative orientation between the microscope body and the objective assembly differs from the predetermined relative orientation.

5. The microscope of claim 3, wherein the electric switch comprises a matching pair of electrical contacting surfaces, wherein one electrical contacting surface of the matching pair of electrical contacting surfaces is included in the objective assembly and the other electrical contacting surface of the matching pair of electrical contacting surfaces is included in the objective assembly mount.

6. The microscope of claim 1, wherein the orientation detection circuit comprises a position sensor configured to detect changes in the relative orientation between the microscope body and the objective assembly.

7. The microscope of claim 1, wherein the objective assembly is configured to selectively pivot relative to the objective assembly mount, such that the relative orientation between the microscope body and the objective assembly differs from the predetermined relative orientation.

8. The microscope of claim 7, wherein the objective assembly mount comprises a receiving region configured to retain the objective assembly, and wherein the receiving region is configured to permit the objective assembly to selectively pivot relative to the objective assembly mount within the receiving region.

9. The microscope of claim 1, wherein the objective assembly mount further comprises a magnetic assembly configured to bias the objective assembly towards the predetermined relative orientation.

10. The microscope of claim 1, further comprising a drive mechanism configured to operatively translate the microscope along an optical axis of the objective lens.

11. The microscope of claim 1, further comprising a controller, wherein the controller comprises:
non-transitory memory comprising stored computer-readable instructions for stopping movement of the microscope when an indication that the relative orientation between the microscope body and the objective assembly differs from the predetermined relative orientation is received from the orientation detection circuit; and
a processing unit programmed to execute the stored computer-readable instructions.

12. A method of detecting a collision between the microscope of claim 1 and an object, the method comprising:
moving the microscope and the object relative to one another;
physically contacting the objective assembly and the object;
responsive to the physically contacting, moving the objective assembly relative to the microscope body; and
detecting the moving of the objective assembly relative to the microscope body.

13. The method of claim 12, wherein the adjusting the moving of the microscope comprises one or more of: ceasing motion of the microscope and retracting the microscope away from the object.

14. The method of claim 12, further comprising generating an alert that is indicative of physical contact between the objective assembly and the object responsive to the detecting the moving of the objective assembly relative to the microscope body.

15. The method of claim 12, further comprising one or more of: ceasing motion of a test probe and retracting the test probe away from the objective assembly responsive to the detecting the moving of the objective assembly relative to the microscope body.

16. The method of claim 12, further comprising one or more of: ceasing motion of a device under test and retracting the device under test responsive to the detecting the moving of the objective assembly relative to the microscope body.

17. The method of claim 12, wherein the detecting the moving of the objective assembly relative to the microscope body is based on a change of an electrical continuity of an electric switch at least partially included in the objective assembly.

18. The method of claim 12, wherein the moving the objective assembly relative to the microscope body further comprises pivoting the objective assembly relative to the microscope body to change the relative orientation between the microscope body and the objective assembly from the predetermined relative orientation.

19. A probe system for testing a device under test (DUT), the probe system comprising:
a chuck that defines a support surface configured to receive a substrate that includes the DUT;
a probe configured to communicate with the DUT;
a signal generation and analysis assembly configured to provide a test signal to the DUT and also to receive a resultant signal from the DUT;
the microscope of claim 1, wherein the microscope is configured to collect an image of at least one of the probe and the DUT; and
at least one of:
(i) a manipulator configured to operatively translate the probe relative to the support surface; and
(ii) a drive assembly configured to selectively control a relative orientation between the probe and the support surface.

* * * * *